US012471114B2

(12) United States Patent
Ratasuk et al.

(10) Patent No.: US 12,471,114 B2
(45) Date of Patent: Nov. 11, 2025

(54) METHOD TO INDICATE CELL SUPPORT FOR REDUCED CAPABILITY UE

(71) Applicant: Nokia Technologies Oy, Espoo (FI)

(72) Inventors: Rapeepat Ratasuk, Inverness, IL (US); Nitin Mangalvedhe, Hoffman Estates, IL (US); David Bhatoolaul, Swindon Wiltshire (GB)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 18/019,521

(22) PCT Filed: Jul. 27, 2021

(86) PCT No.: PCT/EP2021/070977
§ 371 (c)(1),
(2) Date: Feb. 3, 2023

(87) PCT Pub. No.: WO2022/028950
PCT Pub. Date: Feb. 10, 2022

(65) Prior Publication Data
US 2023/0319841 A1    Oct. 5, 2023

Related U.S. Application Data

(60) Provisional application No. 63/060,335, filed on Aug. 3, 2020.

(51) Int. Cl.
*H04W 72/232*  (2023.01)
*H04L 1/00*  (2006.01)
(Continued)

(52) U.S. Cl.
CPC ......... *H04W 72/232* (2023.01); *H04L 1/0063* (2013.01); *H04W 72/1263* (2013.01); *H04W 72/51* (2023.01)

(58) Field of Classification Search
None
See application file for complete search history.

(56) References Cited

U.S. PATENT DOCUMENTS

2017/0373902 A1   12/2017   Zhang et al.
2019/0364489 A1   11/2019   Liberg et al.
(Continued)

FOREIGN PATENT DOCUMENTS

CN    202010635122    *   7/2020
JP    2020-074118     *   4/2020
(Continued)

OTHER PUBLICATIONS

Author Unknown, On UE complexity reduction features, Doc. No. R1-200303828, pp. 1-4, Jun. 5, 2020.*
Huawei et al., "Other aspects for reduced capability device," 3GPP TSG RAN WG1 Meeting #101-e, R1-2004612, May 25-Jun. 5, 2020.
(Continued)

*Primary Examiner* — Christopher M Crutchfield
(74) *Attorney, Agent, or Firm* — Lippes Mathias LLP

(57) ABSTRACT

According to an example aspect of the present invention there is provided apparatus including means for monitoring a physical downlink control channel of a cell for downlink control information; and means for, in response to detecting the downlink control information, determining whether a field of the downlink control information indicates that a reduced capability user equipment is supported in the cell.

30 Claims, 5 Drawing Sheets

(51) Int. Cl.
*H04W 72/1263* (2023.01)
*H04W 72/51* (2023.01)

(56) References Cited

U.S. PATENT DOCUMENTS

| | | | |
|---|---|---|---|
| 2022/0279595 A1* | 9/2022 | Jang | H04W 48/18 |
| 2023/0147138 A1* | 5/2023 | Maki | H04W 72/0446 |
| | | | 714/726 |
| 2023/0180110 A1* | 6/2023 | Kim | H04W 48/02 |
| | | | 370/329 |
| 2023/0247526 A1* | 8/2023 | Liu | H04W 48/02 |
| | | | 455/422.1 |

FOREIGN PATENT DOCUMENTS

| | | | |
|---|---|---|---|
| KR | 10-2019-0099636 | * | 8/2019 |
| KR | 10-2020-0058656 | * | 5/2020 |
| WO | WO 2021/093183 A1 | | 5/2021 |

OTHER PUBLICATIONS

Nokia et al., "Framework and Principles for Reduced Capability Devices," 3GPP TSG RAN WG1#102-e, R1-2005528, Aug. 17-28, 2020.

ZTE Corporation et al., "Identification, Access and Camping Restriction," 3GPP TSG-RAN WG2 Meeting #114e, R2-2105161, May 19-27, 2021.

Huawei et al., "Other aspects for reduced capability devices," 3GPP TSG RAN WG1 Meeting #103-e, R1-2008329, Oct. 26-Nov. 13, 2020.

\* cited by examiner

METHOD TO INDICATE CELL SUPPORT FOR REDUCED CAPABILITY UE

CROSS REFERENCE TO RELATED APPLICATION

This patent application is a U.S. National Stage application of International Patent Application Number PCT/EP2021/070977 filed Jun. 27, 2021, which claims priority to U.S. Provisional Application No. 63/060,335 filed Aug. 3, 2020, which are hereby incorporated by reference in their entireties.

TECHNICAL FIELD

The examples and non-limiting embodiments relate generally to communications and, more particularly, to a method to indicate cell support for a reduced capability UE.

BACKGROUND

It is known to provide wireless network access to a user equipment.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
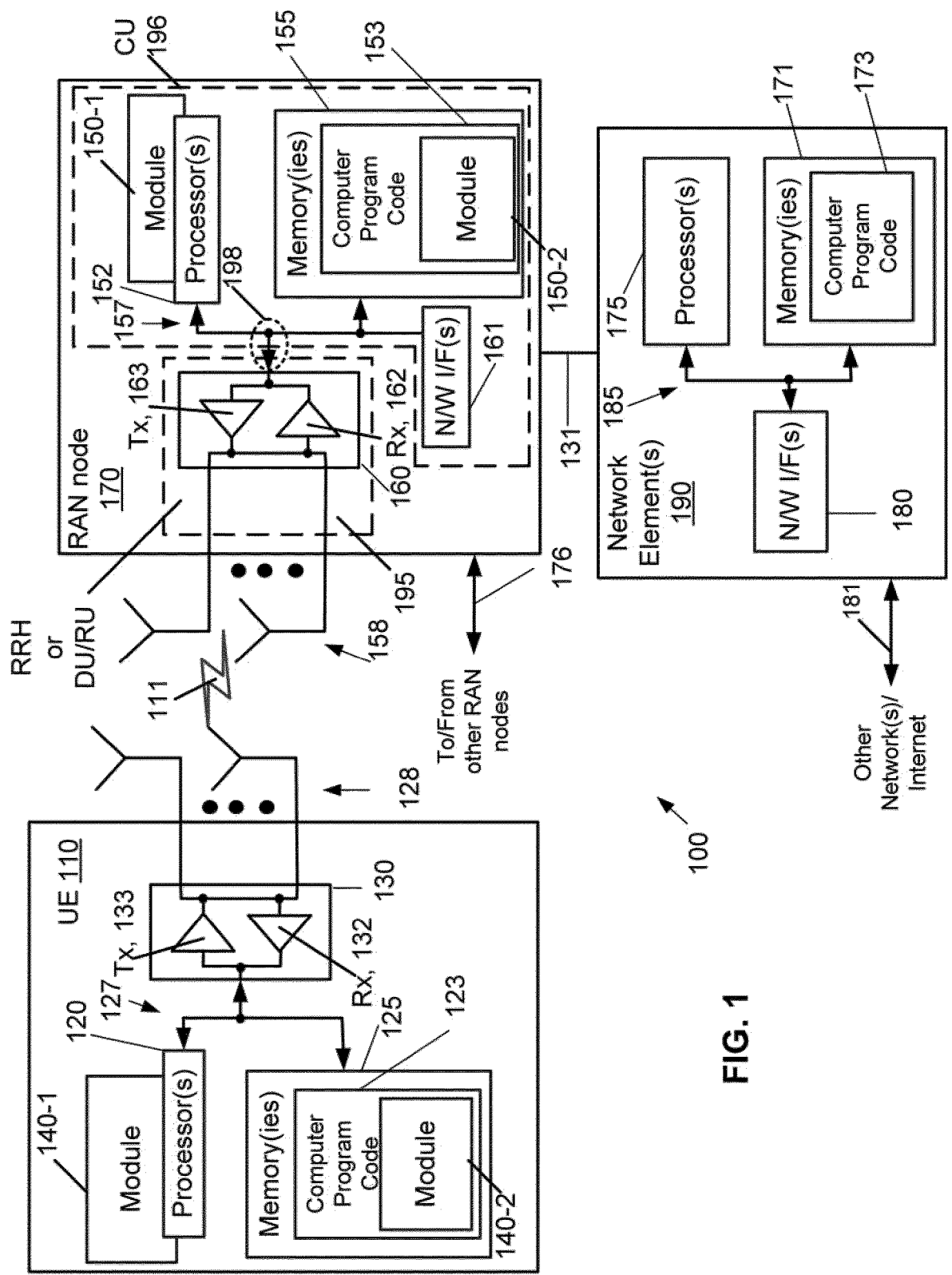
FIG. 1 is a block diagram of one possible and non-limiting system in which the example embodiments may be practiced.

The following acronyms and abbreviations that may be found in the specification and/or the drawing figures are defined as follows:

| | |
|---|---|
| 3GPP | third generation partnership project (or project partner) |
| 4G | fourth generation |
| 5G | fifth generation |
| 5GC | 5G core network |
| AL | aggregation level |
| AMF | access (or core access) and mobility management function |
| BS | base station |
| BW | bandwidth |
| BWP | bandwidth part |
| Cat-M | category machine |
| Cat-NB | category narrowband |
| CORESET | control resource set |
| CSG | closed subscriber group |
| CU | central unit or centralized unit |
| DCI | downlink control information |
| DL | downlink |
| DU | distributed unit |
| DSP | digital signal processor |
| eMTC | enhanced machine type communication |
| eNB | evolved/enhanced Node B (e.g., an LTE base station) |
| EN-DC | E-UTRA-NR dual connectivity |
| en-gNB | node providing NR user plane and control plane protocol terminations towards the UE, and acting as a secondary node in EN-DC |
| E-UTRA | evolved universal terrestrial radio access, i.e., the LTE radio access technology |
| E-UTRA-NR | E-UTRA new radio |
| F1 | control interface between CU and DU |
| FDD | frequency division duplex |
| FR | frequency |
| FR1 | frequency range 1 |
| FR2 | frequency range 2 |
| gNB | next generation Node B, base station for 5G/NR, i.e., a node providing NR user plane and control plane protocol terminations towards the UE, and connected via the NG interface to the 5GC |
| HetNet | heterogeneous network |
| I/F | interface |
| I/O | input/output |
| IoT | Internet of Things |
| L1 | layer 1 (PHY) |
| LTE | long term evolution (4G) |
| LWPA | low-power wide-area |
| MAC | medium access control |
| MIB | master information block |
| MME | mobility management entity |
| NB-IoT | narrowband internet of things |
| ng or NG | new generation |
| ng-eNB | new generation eNB |
| NG-RAN | new generation radio access network |
| NPSS | narrowband primary synchronization signal |
| NR | new radio (5G) |
| NSSS | narrowband secondary synchronization signal |
| NW or N/W | network |
| PBCH | physical broadcast channel |
| PDCCH | physical downlink control channel |
| PDCP | packet data convergence protocol |
| PDSCH | physical downlink shared channel |
| PHY | physical layer |
| PLMN | public land mobile network |
| PSS | primary synchronization signal |
| QAM | quadrature amplitude modulation |
| RAN | radio access network |
| RAT | radio access technology |
| Rel- | release |
| RedCap | reduced capability |
| RLC | radio link control |
| RP- | 3GPP RAN |
| RRC | radio resource control |
| RRH | remote radio head |
| RSRP | reference signal received power |
| RU | radio unit |
| Rx or RX | receiver or interchangeably receive |
| SDAP | service data adaptation protocol |
| SGW | serving gateway |
| SI | study item |
| SIB | system information block |
| SIB1 | system information block type 1 |
| SIB-R | system information block RedCap |
| SI-RNTI | system information radio network temporary identifier |
| SMF | session management function |
| SSB | synchronization signal block |
| SSS | secondary synchronization signal |
| TS | technical specification |
| Tx or TX | transmitter or interchangeably transmit |
| UE | user equipment (e.g., a wireless, typically mobile device) |
| UL | uplink |
| UPF | user plane function |
| WG | working group |

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is anode providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by the gNB-CU 196. One gNB-CU supports one or multiple cells. One cell is supported by only one gNB-DU. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell performs the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Each of UE 110, RAN node 170, and network element 190 and any of their associated components may be configured to implement a method (or portions of a method) to indicate cell support for a reduced capability UE (i.e. whether the cell supports or allows access by UE with reduced capabilities). This includes computer program code 123 and modules 140-1 and 140-2, computer program code 153 and modules 150-1 and 150-2, and/or computer program code 173.

In 3GPP Rel-17, standards for Reduced Capability (RedCap) UE are to be introduced (RP-193238). The intended use cases for RedCap UE include industrial wireless sensors, video surveillance, and wearables.

For the industrial wireless sensors RedCap UE use case, communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, the latency requirement is lower, e.g. 5-10 ms.

For the video surveillance RedCap UE use case, as described in TS 22.804, the reference economic video bitrate is to be 2-4 Mbps, latency less than 500 ms, and reliability 99%-99.9%. High-end video e.g. for farming would require 7.5-25 Mbps. It is noted that traffic pattern is dominated by UL transmissions.

For the wearables RedCap UE use case, the reference bitrate for a smart wearable application can be 5-50 Mbps in DL and a minimum 2-5 Mbps in UL, and the peak bit rate of the device higher, e.g. up to 150 Mbps for downlink and up to 50 Mbps for uplink. The battery of the device should last multiple days (up to 1-2 weeks).

Several complexity reduction techniques are being studied including a reduced number of UE RX/TX antennas, UE bandwidth reduction (note that Rel-15 SSB bandwidth should be reused and L1 changes minimized), Half-Duplex-FDD, relaxed UE processing time, and relaxed UE processing capability.

It is likely that a RedCap UE has reduced capability with specifications of BW: 20 MHz for FR1, and 50 or 100 MHz for FR2; 1 Tx antenna, and 1 or 2 Rx antenna depending on the FR and band to mitigate coverage loss; reduced capability such as limited peak data rates, restricted modulation levels (e.g. 64-QAM in DL and 16-QAM in UL); and optional half-duplex FDD.

Furthermore, the study item (SI) has objectives including to study the standardization framework and principles for how to define and constrain such reduced capabilities, considering the definition of a limited set of one or more device types and considering how to ensure those device types are only used for the intended use cases. Objectives of the SI also include to study functionality that allows devices with reduced capabilities to be explicitly identifiable to networks and network operators, and allow operators to restrict their access, if desired.

RedCap UEs may not be supported in all cells as some operators do not want RedCap UEs in their network since this would negatively impact their cell capacity. Or, operators may limit RedCap UEs to certain cells (e.g. macro-cells instead of small-cells) in heterogeneous network deployment.

In LTE, there are two low-power wide-area (LWPA) IoT technologies, NB-IoT and eMTC. In NB-IoT, the UE checks for the presence of NPSS/NSSS to see if the NB-IoT UE (i.e. Cat-NB UE) is supported in the cell (i.e. if the NB-IoT UE can access the cell). In eMTC, the UE checks the MIB reserved or spare bits in PBCH for eMTC UE (i.e. Cat-M UE) support. Based on these checks, the UE can quickly determine whether the cell supports eMTC or NB-IoT. If not, the UE can switch to searching another cell and save significant power.

For NR, a RedCap UE will reuse legacy SSB (PSS/SSS/PBCH) as specified in the study item objective and there is not enough spare bits in the MIB to indicate RedCap UE support in the cell. This means that the RedCap UE cannot determine whether it can access the cell from the SSB or MIB. Instead, it must read SIB1 before determining if it can access the cell. The drawback with this approach is that there is high SIB1 overhead due to additional repetition needed to reach the RedCap UE (e.g. 320% more repetition SIB1 is needed if the UE has 1 Rx instead of 2 Rx antennas, and SIB1 can be as large as 2976 bits but a typical value may be around 1000 bits). Alternately, if SIB1 overhead is not increased, some UEs in poor coverage may keep trying to read SIB1 until a timeout. This can result in high UE power consumption.

Therefore, the problem this invention solves is the RedCap UE being able to quickly determine that the cell does not support this type of UE (a RedCap UE) without having to read SIB1. This allows the UE to quickly switch to searching for another cell (resulting in power saving benefits) and also save network overhead from having to ensure SIB1 can be decoded by the RedCap UE (i.e. no additional SIB1 repetition).

Thus, in NB-IoT, the UE checks for the presence of NPSS/NSSS to see if NB-IoT (i.e. Cat-NB UE) is supported in the cell. In eMTC, the UE checks spare bits of MIB in PBCH for eMTC (i.e. Cat-M UE) support. These methods are not possible for a RedCap UE.

The novel steps of the examples described herein include:

Instead of indicating RedCap support in SIB1, information about RedCap support is indicated in PDCCH scheduling SIB1. This moves or duplicates some SIB1 fields related to RedCap from SIB1 (PDSCH) to DCI (PDCCH).

A new field is introduced in the DCI that schedules SIB1 to indicate information about RedCap support in this cell. There are 15 reserved or spare bits in DCI Format 1_0 transmitted on the PDCCH, and some of these spare bits may be used to indicate information about RedCap support in this cell.

The DCI spare bits may also contain additional assistance for the RedCap UE. Examples include inclusion of access barring information based on a RedCap UE capability set in the DCI, e.g. some RedCap capability sets (e.g. sensors, 1Rx antenna) are not supported in the cell; inclusion of basic SIB1 information in the DCI to help with system access check and to speed up system information acquisition e.g. PLMN identity or additional repetition pattern; and scheduling and transmission of RedCap cell access reselection information to help the UE in finding a RedCap-enabled cell in case this cell does not support RedCap.

Detailed steps and embodiments are further described as follows.

Instead of indicating RedCap support in SIB1, RedCap support is indicted in DCI scheduling SIB1. This moves or duplicates some SIB1 fields related to RedCap from SIB1 (PDSCH) to DCI (PDCCH).

A new field in the DCI is introduced that schedules SIB1 to indicate information about RedCap support in this cell. In DCI there are 15 spare bits in DCI Format 1_0, and some of these spare bits may be used to indicate whether the cell supports a RedCap UE or not.

The DCI spare bits can also contain additional assistance for a RedCap UE. Examples include inclusion of access barring information based on the RedCap UE capability set in the DCI, an indication of time for which the RedCap UE must consider this cell as barred, inclusion of some basic SIB1 cell access information in the DCI to help with system access check and speed up system information acquisition, and scheduling and transmission of RedCap cell access reselection information to help the UE in finding a RedCap-enabled cell in case this cell does not support RedCap.

Thus, in one example, additional assistance for a RedCap UE may include access barring information based on a RedCap UE capability set in the DCI, e.g. some RedCap capability sets (e.g. sensors, 1Rx antenna) are not supported in the cell. Otherwise the UE has to go through initial access, report its capability, then be rejected from the system. Access barring information may be separately indicated for each UE capability set that is independently identifiable.

In another example, additional assistance for a RedCap UE may include an indication of time for which the RedCap UE must consider this cell as barred. The cell may bar RedCap UEs temporarily during times of congestion. E.g., 2-3 bits may be used to indicate one of a predefined set of values. One of the predefined values may indicate permanent barring—i.e., access to RedCap UEs is barred indefinitely. The UE may try to access this cell again after the expiration of the indicated time value. The indicated value may be updated (reduced) over the barring period until it is finally removed to lift the access barring.

In another example, additional assistance for a RedCap UE may include inclusion of some basic SIB1 cell access information in the DCI to help with system access check and speed up system information acquisition, e.g. PLMN identity or additional repetition pattern. PLMN identity is used by the UE to check whether it is allowed to access cells belonging to this mobile operator. This can help speed up UE access to the cell or determine that it cannot access this cell. This information is not related to access barring but cell-related information in SIB1 such as PLMN identity list, tracking area code, cell identity, CSG identity, cell selection information, etc.

In another example, additional assistance for a RedCap UE may include scheduling and transmission of RedCap cell access reselection information to help the UE in finding a RedCap-enabled cell in case this cell does not support RedCap. For example, spare bits can indicate SIB-R scheduling information where SIB-R can provide assistance information (e.g. neighbor list, frequency) as to where RedCap cells are supported. For example, in HetNet, small cells may not support RedCap but SIB-R can direct the RedCap UE to a macro-cell for coverage.

Using this method, the RedCap UE reads the SSB (i.e. UE detects the synchronization signals and decodes the physical broadcast channel transmitted in the SSB) like a legacy NR UE. It then monitors the PDCCH in CORESET with index 0 (or CORESET #0) for DCI Format 1_0 that is scrambled by the SI-RNTI (i.e. the cyclic redundancy check bits (CRC) of DCI Format 1_0 are scrambled by the SI-RNTI). When it detects this DCI, it checks the spare bits for cell RedCap support and assistance information. Detailed RedCap support information (e.g. coverage enhancement information, RedCap CORESET configuration) can still be in SIB1.

From an overhead perspective, the size of DCI Format 1_0 (e.g. 48 bits) is much smaller than SIB1, so even if a higher aggregation level (AL) or additional repetition is required for PDCCH coverage enhancement or recovery, the impact is much smaller. Because the PDCCH CORESET #0 is known to a legacy UE, the described method has no impact to legacy UE rate matching.

Figure 2:
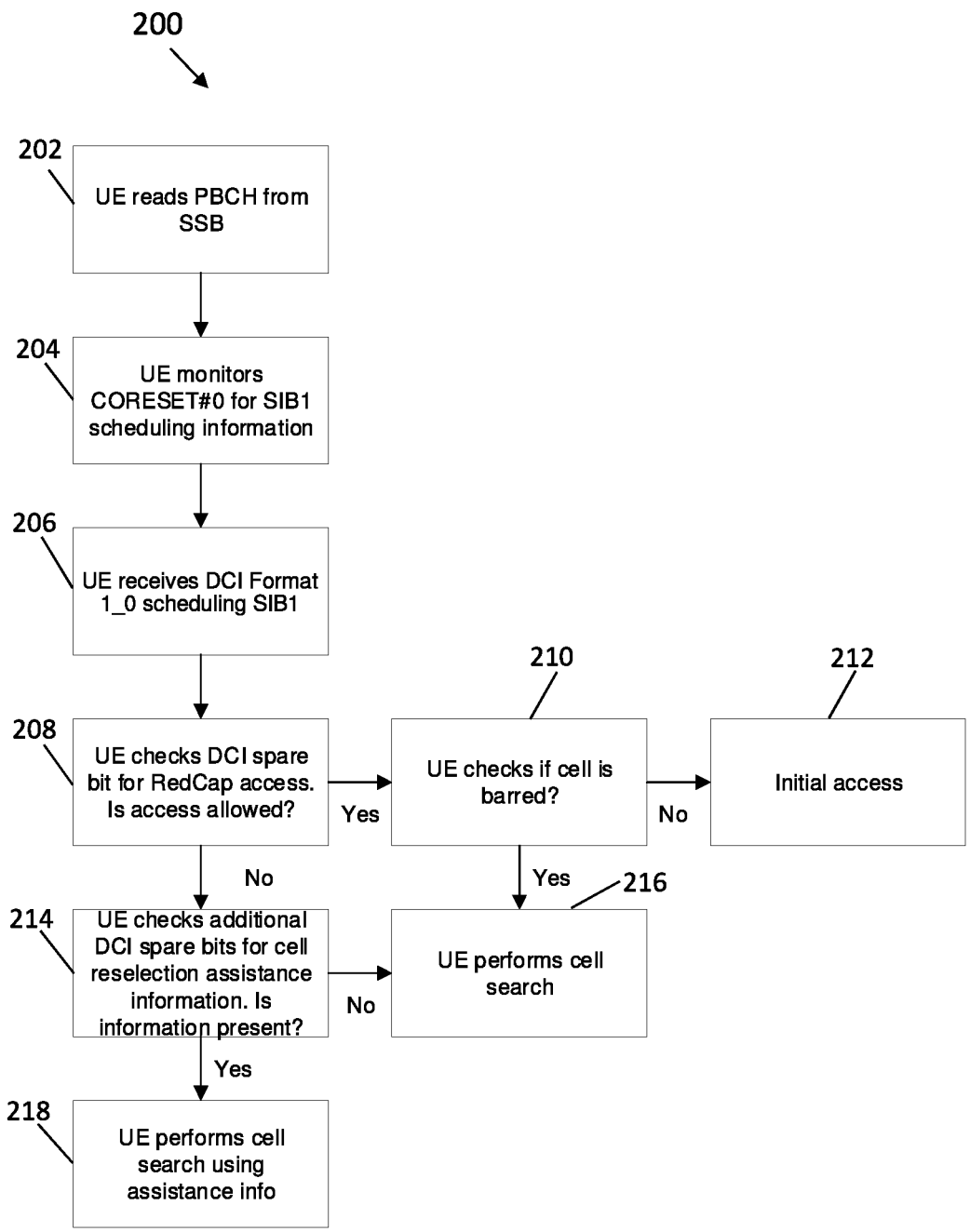
FIG. 2 is an example flowchart for a RedCap UE cell access check.

FIG. 2 illustrates an example flow chart, or method 200, for UE cell access check. At 202, the UE reads PBCH from SSB. At 204, the UE monitors CORESET #0 for SIB1 scheduling information. At 206, the UE receives DCI Format 1_0 scheduling SIB1. At 208, the UE checks the DCI spare bit for RedCap access to determine whether access is allowed. If access is allowed at 208 (e.g. Yes), the method transitions to 210, where the UE checks if the cell is barred. If at 210 the cell is not barred (e.g. No), then the method transitions to 212 where the UE is given initial access. If at 210 the cell is barred (e.g. Yes), then the method transitions to 216 where the UE performs cell search.

If on the other hand access is not allowed at 208 (e.g. No), then the method transitions to 214 where the UE checks additional DCI spare bits for cell reselection assistance information. If cell reselection assistance information is not present at 214 (e.g. No), then the method transitions to 216 where the UE performs cell search. If cell reselection assistance information is present at 214 (e.g. Yes), then the method transitions to 218 where the UE performs cell search using the assistance information.

Figure 3:
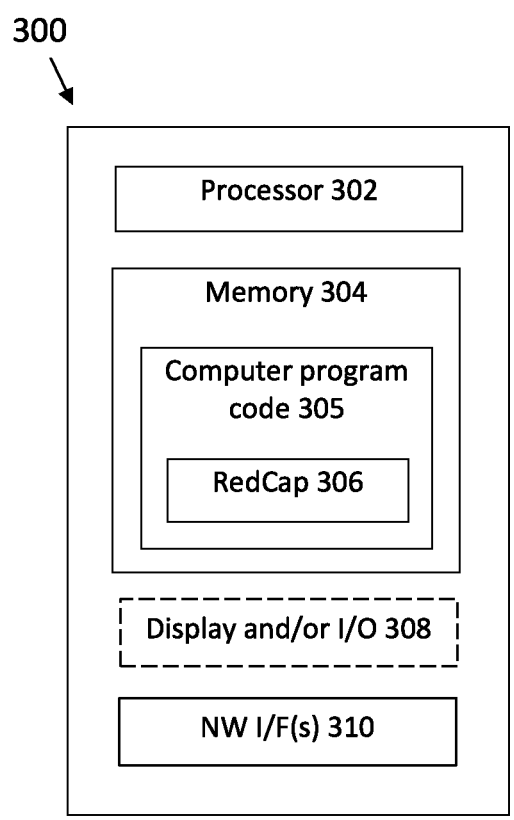
FIG. 3 is an example apparatus configured to implement a method to indicate cell support for a reduced capability UE, based on the examples described herein.

FIG. 3 is an example apparatus 300, which may be implemented in hardware, configured to implement a method to indicate cell access/support for a reduced capability UE, based on the examples described herein. The apparatus 300 comprises a processor 302, at least one non-transitory memory 304 including computer program code 305, wherein the at least one memory 304 and the computer program code 305 are configured to, with the at least one processor 302, cause the apparatus to implement a process, component, module, or function (collectively RedCap 306) to implement a method to indicate cell access/support for a reduced capability UE. The apparatus 300 optionally includes a display and/or I/O interface 308 that may be used to display aspects or a status of the method described herein (e.g., as the method is being performed or at a subsequent time). The apparatus 300 includes one or more network (NW) interfaces (I/F(s)) 310. The NW I/F(s) 310 may be wired and/or wireless and communicate over the Internet/other network(s) via any communication technique. The NW I/F(s) 310 may comprise one or more transmitters and one or more receivers.

The apparatus 300 may be UE 110, RAN node 170, or Network Element(s) 190. Thus, processor 302 may correspond to processor(s) 120, processor(s) 152, or processor(s) 175, memory 304 may correspond to memory(ies) 125, memory(ies) 155, or memory(ies) 171, computer program code 305 may correspond to computer program code 123, module 140-1, module 140-2, computer program code 153, module 150-1, module 150-2, or computer program code 173, and NW I/F(s) 310 may correspond to N/W I/F(s) 161 or N/W I/F(s) 180. Alternatively, apparatus 300 may not correspond to either of UE 110, RAN node 170, or Network element(s) 190 (for example, apparatus 300 may be a remote or a cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), systems on a chip (SoC), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4:
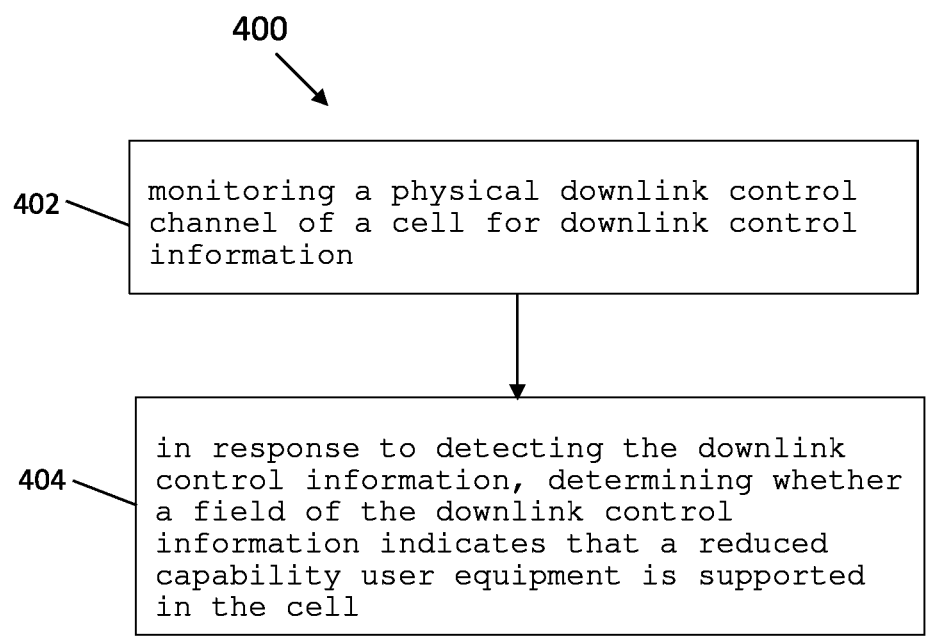
FIG. 4 shows an example method to indicate cell support for a reduced capability UE, based on the examples described herein.

FIG. 4 is an example method 400 to indicate cell access/support for a reduced capability UE, based on the example embodiments described herein. At 402, the method includes monitoring a physical downlink control channel of a cell for downlink control information. At 404, the method includes in response to detecting the downlink control information, determining whether a field of the downlink control information indicates that a reduced capability user equipment is supported in the cell. The method 400 may be performed by a user equipment, such as UE 110 of FIG. 1.

Figure 5:
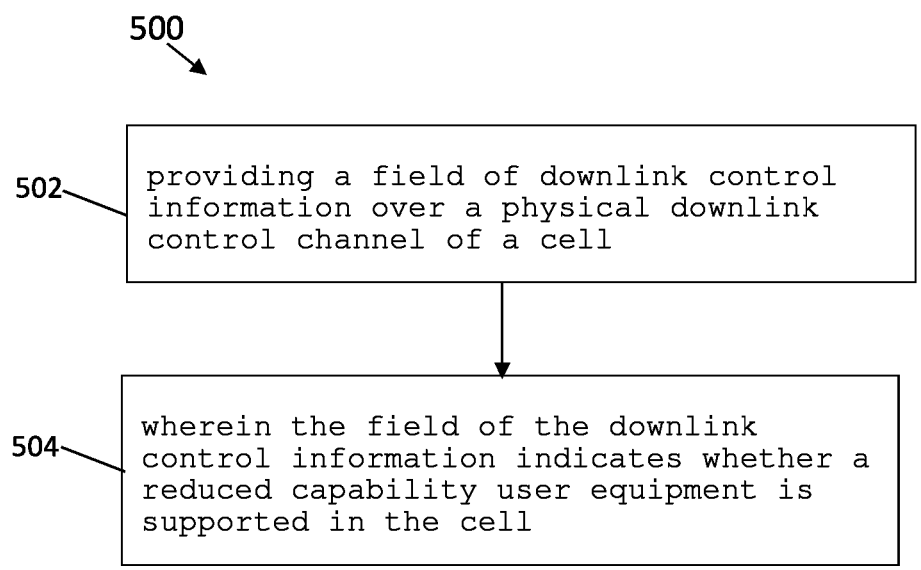
FIG. 5 shows another example method to indicate cell support for a reduced capability UE, based on the examples described herein.

FIG. 5 is another example method 500 to indicate cell access/support for a reduced capability UE, based on the example embodiments described herein. At 502, the method includes providing a field of downlink control information over a physical downlink control channel of a cell. At 504, the method includes wherein the field of the downlink control information indicates whether a reduced capability user equipment is supported in the cell. The method 500 may be performed by a radio node, such as RAN node 170 of FIG. 1, or by a network element, such as network element 190 of FIG. 1.

An example method includes monitoring a physical downlink control channel of a cell for downlink control information; and in response to detecting the downlink control information, determining whether a field of the downlink control information indicates that a reduced capability user equipment is supported in the cell.

The method may further include accessing the cell in response to the field indicating reduced capability UE support.

The method may further include wherein the downlink control information is transmitted on a control resource set used to schedule a system information block, and cyclic redundancy check bits of the downlink control information are scrambled with a system information radio network temporary identifier.

The method may further include wherein the control resource set is CORESET #0, and the system information block scheduling information is SIB1.

The method may further include wherein the downlink control information is DCI Format 1_0.

The method may further include in response to the field of the downlink control information indicating reduced capability support: determining whether the field of the downlink control information or another field comprises assistance information indicating that the cell is barred to the reduced capability user equipment based on a capability set associated with the reduced capability user equipment, or based on a time period consideration; and in response to the cell not being barred, accessing the cell.

The method may further include in response to the cell being barred, performing a search to locate a reduced capability supported cell that is not barred.

The method may further include in response to the field of the downlink control information not indicating reduced capability support: determining whether the field of the downlink control information comprises cell reselection assistance information; in response to determining that the field of the downlink control information comprises cell reselection assistance information, performing a search using the cell reselection assistance information to locate a reduced capability supported cell; and in response to determining that the field of the downlink control information does not comprise cell reselection assistance information, performing a search without using assistance information to locate a reduced capability supported cell.

The method may further include wherein the field of the downlink control information comprises assistance information related to a system access check and/or system information acquisition.

The method may further include wherein the field of the downlink control information comprises at least one bit.

The method may further include wherein the field is implemented using one or more reserved bits of the downlink control information, wherein the one or more reserved bits of the downlink control information are reserved for non-RedCap UEs.

The method may further include decoding a physical broadcast channel from a synchronization signal block to determine whether a cell is accessible.

An example method includes providing a field of downlink control information over a physical downlink control channel of a cell; wherein the field of the downlink control information indicates whether a reduced capability user equipment is supported in the cell.

The method may further include wherein the downlink control information is transmitted on a control resource set used for system information block scheduling information, and cyclic redundancy check bits of the downlink control information are scrambled with a system information radio network temporary identifier.

The method may further include wherein the control resource set is CORESET #0, and the system information block scheduling information is SIB1.

The method may further include wherein the downlink control information is DCI Format 1_0.

The method may further include wherein the field of the downlink control information or another field provides assistance information related to whether the cell is barred to the reduced capability user equipment based on a capability set associated with the reduced capability user equipment, or based on a time period consideration.

The method may further include wherein the field of the downlink control information provides cell reselection assistance information to assist with locating a reduced capability cell.

The method may further include wherein the field of the downlink control information provides assistance information related to a system access check and/or system information acquisition.

The method may further include wherein the field of the downlink control information comprises at least one bit.

The method may further include wherein the field is implemented using one or more reserved bits of the downlink control information, wherein the one or more reserved bits of the downlink control information are reserved for non-RedCap UEs.

An example apparatus includes at least one processor; and at least one non-transitory memory including computer program code; wherein the at least one memory and the computer program code are configured to, with the at least one processor, cause the apparatus at least to perform: monitor a physical downlink control channel of a cell for downlink control information; and in response to detecting the downlink control information, determine whether a field of the downlink control information indicates that a reduced capability user equipment is supported in the cell.

The apparatus may further include wherein the at least one memory and the computer program code are further configured to, with the at least one processor, cause the apparatus at least to perform: accessing the cell in response to the field indicating reduced capability UE support.

The apparatus may further include wherein the downlink control information is transmitted on a control resource set used to schedule a system information block, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include wherein the at least one memory and the computer program code are further configured to, with the at least one processor, cause the apparatus at least to perform: in response to the field of the downlink control information indicating reduced capability support: determining whether the field of the downlink control information or another field comprises assistance information indicating that the cell is barred to the reduced capability user equipment based on a capability set associated with the reduced capability user equipment, or based on a time period consideration; and in response to the cell not being barred, accessing the cell.

The apparatus may further include wherein the at least one memory and the computer program code are further configured to, with the at least one processor, cause the apparatus at least to perform: in response to the cell being barred, performing a search to locate a reduced capability supported cell that is not barred.

The apparatus may further include wherein the at least one memory and the computer program code are further configured to, with the at least one processor, cause the apparatus at least to perform: in response to the field of the downlink control information not indicating reduced capability support: determining whether the field of the downlink control information comprises cell reselection assistance information; in response to determining that the field of the downlink control information comprises cell reselection assistance information, performing a search using the cell reselection assistance information to locate a reduced capability supported cell; and in response to determining that the field of the downlink control information does not comprise cell reselection assistance information, performing a search without using assistance information to locate a reduced capability supported cell.

The apparatus may further include wherein the field of the downlink control information comprises assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

The apparatus may further include wherein the at least one memory and the computer program code are further configured to, with the at least one processor, cause the apparatus at least to perform: decoding a physical broadcast channel from a synchronization signal block to determine whether a cell is accessible.

An example apparatus includes at least one processor; and at least one non-transitory memory including computer program code; wherein the at least one memory and the computer program code are configured to, with the at least one processor, cause the apparatus at least to perform: provide a field of downlink control information over a physical downlink control channel of a cell; wherein the field of the downlink control information indicates whether a reduced capability user equipment is supported in the cell.

The apparatus may further include wherein the downlink control information is transmitted on a control resource set used for system information block scheduling information, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include wherein the field of the downlink control information or another field provides assistance information related to whether the cell is barred to the reduced capability user equipment based on a capability set associated with the reduced capability user equipment, or based on a time period consideration.

The apparatus may further include wherein the field of the downlink control information provides cell reselection assistance information to assist with locating a reduced capability cell.

The apparatus may further include wherein the field of the downlink control information provides assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

An example non-transitory program storage device readable by a machine, tangibly embodying a program of instructions executable by the machine for performing operations may be provided, the operations comprising: monitoring a physical downlink control channel of a cell for downlink control information; and in response to detecting the downlink control information, determining whether a field of the downlink control information indicates that a reduced capability user equipment is supported in the cell.

The operations of the non-transitory program storage device may further include accessing the cell in response to the field indicating reduced capability UE support.

The non-transitory program storage device may further include wherein the downlink control information is transmitted on a control resource set used to schedule a system information block, and cyclic redundancy check bits of the downlink control information are scrambled with a system information radio network temporary identifier.

The non-transitory program storage device may further include wherein the control resource set is CORESET #0, and the system information block scheduling information is SIB1.

The non-transitory program storage device may further include wherein the downlink control information is DCI Format 1_0.

The operations of the non-transitory program storage device may further include in response to the field of the downlink control information indicating reduced capability support: determining whether the field of the downlink control information or another field comprises assistance information indicating that the cell is barred to the reduced capability user equipment based on a capability set associated with the reduced capability user equipment, or based on a time period consideration; and in response to the cell not being barred, accessing the cell.

The operations of the non-transitory program storage device may further include in response to the cell being barred, performing a search to locate a reduced capability supported cell that is not barred.

The operations of the non-transitory program storage device may further include in response to the field of the downlink control information not indicating reduced capability support: determining whether the field of the downlink control information comprises cell reselection assistance information; in response to determining that the field of the downlink control information comprises cell reselection assistance information, performing a search using the cell reselection assistance information to locate a reduced capability supported cell; and in response to determining that the field of the downlink control information does not comprise cell reselection assistance information, performing a search without using assistance information to locate a reduced capability supported cell.

The non-transitory program storage device may further include wherein the field of the downlink control information comprises assistance information related to a system access check and/or system information acquisition.

The non-transitory program storage device may further include wherein the field of the downlink control information comprises at least one bit.

The non-transitory program storage device may further include wherein the field is implemented using one or more reserved bits of the downlink control information, wherein the one or more reserved bits of the downlink control information are reserved for non-RedCap UEs.

The operations of the non-transitory program storage device may further include decoding a physical broadcast channel from a synchronization signal block to determine whether a cell is accessible.

An example non-transitory program storage device readable by a machine, tangibly embodying a program of instructions executable by the machine for performing operations may be provided, the operations comprising: providing a field of downlink control information over a physical downlink control channel of a cell; wherein the field of the downlink control information indicates whether a reduced capability user equipment is supported in the cell.

The non-transitory program storage device may further include wherein the downlink control information is transmitted on a control resource set used for system information block scheduling information, and cyclic redundancy check bits of the downlink control information are scrambled with a system information radio network temporary identifier.

The non-transitory program storage device may further include wherein the control resource set is CORESET #0, and the system information block scheduling information is SIB1.

The non-transitory program storage device may further include wherein the downlink control information is DCI Format 1_0.

The non-transitory program storage device may further include wherein the field of the downlink control information or another field provides assistance information related to whether the cell is barred to the reduced capability user equipment based on a capability set associated with the reduced capability user equipment, or based on a time period consideration.

The non-transitory program storage device may further include wherein the field of the downlink control information provides cell reselection assistance information to assist with locating a reduced capability cell.

The non-transitory program storage device may further include wherein the field of the downlink control information provides assistance information related to a system access check and/or system information acquisition.

The non-transitory program storage device may further include wherein the field of the downlink control information comprises at least one bit.

The non-transitory program storage device may further include wherein the field is implemented using one or more reserved bits of the downlink control information, wherein the one or more reserved bits of the downlink control information are reserved for non-RedCap UEs.

An example apparatus includes means for monitoring a physical downlink control channel of a cell for downlink control information; and means for, in response to detecting the downlink control information, determining whether a field of the downlink control information indicates that a reduced capability user equipment is supported in the cell.

The apparatus may further include means for accessing the cell in response to the field indicating reduced capability UE support.

The apparatus may further include wherein the downlink control information is transmitted on a control resource set used to schedule a system information block, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include in response to the field of the downlink control information indicating reduced capability support: means for determining whether the field of the downlink control information or another field comprises assistance information indicating that the cell is barred to the reduced capability user equipment based on a capability set associated with the reduced capability user equipment, or based on a time period consideration; and in response to the cell not being barred, means for accessing the cell.

The apparatus may further include in response to the cell being barred, means for performing a search to locate a reduced capability supported cell that is not barred.

The apparatus may further include in response to the field of the downlink control information not indicating reduced capability support: means for determining whether the field of the downlink control information comprises cell reselection assistance information; in response to determining that the field of the downlink control information comprises cell reselection assistance information, means for performing a search using the cell reselection assistance information to locate a reduced capability supported cell; and in response to determining that the field of the downlink control information does not comprise cell reselection assistance information, means for performing a search without using assistance information to locate a reduced capability supported cell.

The apparatus may further include wherein the field of the downlink control information comprises assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

The apparatus may further include means for decoding a physical broadcast channel from a synchronization signal block to determine whether a cell is accessible.

An example apparatus includes means for providing a field of downlink control information over a physical downlink control channel of a cell; wherein the field of the downlink control information indicates whether a reduced capability user equipment is supported in the cell.

The apparatus may further include wherein the downlink control information is transmitted on a control resource set used for system information block scheduling information, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include wherein the field of the downlink control information or another field provides assistance information related to whether the cell is barred to the reduced capability user equipment based on a capability set associated with the reduced capability user equipment, or based on a time period consideration.

The apparatus may further include wherein the field of the downlink control information provides cell reselection assistance information to assist with locating a reduced capability cell.

The apparatus may further include wherein the field of the downlink control information provides assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

An example apparatus includes circuitry configured to monitor a physical downlink control channel of a cell for downlink control information; and circuitry configured to, in response to detecting the downlink control information, determine whether a field of the downlink control information indicates that a reduced capability user equipment is supported in the cell.

The apparatus may further include circuitry configured to access the cell in response to the field indicating reduced capability UE support.

The apparatus may further include wherein the downlink control information is transmitted on a control resource set used to schedule a system information block, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include circuitry configured to, in response to the field of the downlink control information indicating reduced capability support: determine whether the field of the downlink control information or another field comprises assistance information indicating that the cell is barred to the reduced capability user equipment based on a capability set associated with the reduced capability user equipment, or based on a time period consideration; and circuitry configured to, in response to the cell not being barred, access the cell.

The apparatus may further include circuitry configured to, in response to the cell being barred, perform a search to locate a reduced capability supported cell that is not barred.

The apparatus may further include circuitry configured to, in response to the field of the downlink control information not indicating reduced capability support: determine whether the field of the downlink control information comprises cell reselection assistance information; circuitry configured to, in response to determining that the field of the downlink control information comprises cell reselection assistance information, perform a search using the cell reselection assistance information to locate a reduced capability supported cell; and circuitry configured to, in response to determining that the field of the downlink control information does not comprise cell reselection assistance information, perform a search without using assistance information to locate a reduced capability supported cell.

The apparatus may further include wherein the field of the downlink control information comprises assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

The apparatus may further include circuitry configured to decode a physical broadcast channel from a synchronization signal block to determine whether a cell is accessible.

An example apparatus includes circuitry configured to provide a field of downlink control information over a physical downlink control channel of a cell; wherein the field of the downlink control information indicates whether a reduced capability user equipment is supported in the cell.

The apparatus may further include wherein the downlink control information is transmitted on a control resource set used for system information block scheduling information, and cyclic redundancy check bits of the downlink control information are scrambled with a system information radio network temporary identifier.

The apparatus may further include wherein the control resource set is CORESET #0, and the system information block scheduling information is SIB1.

The apparatus may further include wherein the downlink control information is DCI Format 1_0.

The apparatus may further include wherein the field of the downlink control information or another field provides assistance information related to whether the cell is barred to the reduced capability user equipment based on a capability set associated with the reduced capability user equipment, or based on a time period consideration.

The apparatus may further include wherein the field of the downlink control information provides cell reselection assistance information to assist with locating a reduced capability cell.

The apparatus may further include wherein the field of the downlink control information provides assistance information related to a system access check and/or system information acquisition.

The apparatus may further include wherein the field of the downlink control information comprises at least one bit.

The apparatus may further include wherein the field is implemented using one or more reserved bits of the downlink control information, wherein the one or more reserved bits of the downlink control information are reserved for non-RedCap UEs.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   monitoring a physical downlink control channel of a cell for downlink control information; and
   in response to detecting the downlink control information, determining whether a field of the downlink control information indicates that a reduced capability user equipment is supported in the cell,
   in response to the field of the downlink control information not indicating reduced capability support:
   determining whether the field of the downlink control information comprises cell reselection assistance information;
   in response to determining that the field of the downlink control information comprises cell reselection assistance information, performing a search using the cell reselection assistance information to locate a reduced capability supported cell; and
   in response to determining that the field of the downlink control information does not comprise cell reselection assistance information, performing a search without using assistance information to locate a reduced capability supported cell.

2. The method of claim 1, further comprising accessing the cell in response to the field indicating reduced capability user equipment support.

3. The method of claim 1, wherein the downlink control information is transmitted on a control resource set used to schedule a system information block, and cyclic redundancy check bits of the downlink control information are scrambled with a system information radio network temporary identifier.

4. The method of claim 3, wherein the control resource set is CORESET #0, and the system information block scheduling information is SIB1.

5. The method of claim 1, wherein the downlink control information is DCI Format 1_0.

6. The method of claim 1, further comprising:
   in response to the field of the downlink control information indicating reduced capability support:

determining whether the field of the downlink control information or another field comprises assistance information indicating that the cell is barred to the reduced capability user equipment based on a capability set associated with the reduced capability user equipment, or based on a time period consideration; and in response to the cell not being barred, accessing the cell.

7. The method of claim 6, further comprising:

in response to the cell being barred, performing a search to locate a reduced capability supported cell that is not barred.

8. The method of claim 1, wherein the field of the downlink control information comprises assistance information related to a system access check and/or system information acquisition.

9. The method of claim 1, wherein the field of the downlink control information comprises at least one bit.

10. The method of claim 1, wherein the field is implemented using one or more reserved bits of the downlink control information, wherein the one or more reserved bits of the downlink control information are reserved for non-RedCap user equipments.

11. The method of claim 1, further comprising decoding a physical broadcast channel from a synchronization signal block to determine whether a cell is accessible.

12. A method comprising:

providing a field of downlink control information over a physical downlink control channel of a cell;

wherein the field of the downlink control information indicates whether a reduced capability user equipment is supported in the cell, wherein the field of the downlink control information or another field provides assistance information related to whether the cell is barred to the reduced capability user equipment based on a capability set associated with the reduced capability user equipment, or based on a time period consideration, wherein the field of the downlink control information provides cell reselection assistance information to assist with locating a reduced capability cell, wherein the field of the downlink control information provides assistance information related to a system access check and/or system information acquisition, wherein the field of the downlink control information comprises at least one bit, wherein the field is implemented using one or more reserved bits of the downlink control information, wherein the one or more reserved bits of the downlink control information are reserved for non-RedCap user equipments.

13. The method of claim 12, wherein the downlink control information is transmitted on a control resource set used for system information block scheduling information, and cyclic redundancy check bits of the downlink control information are scrambled with a system information radio network temporary identifier.

14. The method of claim 13, wherein the control resource set is CORESET #0, and the system information block scheduling information is SIB1.

15. The method of claim 12, wherein the downlink control information is DCI Format 1_0.

16. The method of claim 12, wherein the field of the downlink control information or another field provides assistance information related to whether the cell is barred to the reduced capability user equipment based on a capability set associated with the reduced capability user equipment, or based on a time period consideration.

17. The method of claim 12, wherein the field of the downlink control information provides cell reselection assistance information to assist with locating a reduced capability cell.

18. The method of claim 12, wherein the field of the downlink control information provides assistance information related to a system access check and/or system information acquisition.

19. The method of claim 12, wherein the field of the downlink control information comprises at least one bit.

20. The method of claim 12, wherein the field is implemented using one or more reserved bits of the downlink control information, wherein the one or more reserved bits of the downlink control information are reserved for non-RedCap UEs.

21. An apparatus comprising:

at least one processor; and at least one non-transitory memory storing instructions that, when executed with the at least one processor, cause the apparatus to perform:

monitoring a physical downlink control channel of a cell for downlink control information; and in response to detecting the downlink control information, determining whether a field of the downlink control information indicates that a reduced capability user equipment is supported in the cell, where the instructions, when executed with the at least one processor, cause the apparatus to perform:

in response to the field of the downlink control information not indicating reduced capability support:

determining whether the field of the downlink control information comprises cell reselection assistance information; in response to determining that the field of the downlink control information comprises cell reselection assistance information, performing a search using the cell reselection assistance information to locate a reduced capability supported cell; and in response to determining that the field of the downlink control information does not comprise cell reselection assistance information, performing a search without using assistance information to locate a reduced capability supported cell.

22. The apparatus of claim 21, where the instructions, when executed with the at least one processor, cause the apparatus to perform accessing the cell in response to the field indicating reduced capability UE support, wherein the downlink control information is transmitted on a control resource set used to schedule a system information block, and cyclic redundancy check bits of the downlink control information are scrambled with a system information radio network temporary identifier, wherein the control resource set is CORESET #0, and the system information block scheduling information is SIB1.

23. The apparatus of claim 21, wherein the downlink control information is DCI Format 1_0.

24. The apparatus of claim 21, where, in response to the field of the downlink control information indicating reduced capability support the instructions, when executed with the at least one processor, cause the apparatus to perform:

determining whether the field of the downlink control information or another field comprises assistance information indicating that the cell is barred to the reduced capability user equipment based on a capability set associated with the reduced capability user equipment, or based on a time period consideration; and in response to the cell not being barred, accessing the cell, and in response to the cell being barred, performing a search to locate a reduced capability supported cell that is not barred.

25. The apparatus of claim 21, wherein the field of the downlink control information comprises assistance information related to a system access check and/or system information acquisition, wherein the field of the downlink control information comprises at least one bit, wherein the field is implemented using one or more reserved bits of the downlink control information, wherein the one or more reserved bits of the downlink control information are reserved for non-RedCap user equipments, and where the instructions, when executed with the at least one processor, cause the apparatus to perform decoding a physical broadcast channel from a synchronization signal block to determine whether a cell is accessible.

26. An apparatus comprising:
at least one processor; and
at least one non-transitory memory storing instructions that, when executed with the at least one processor, cause the apparatus to perform:
providing a field of downlink control information over a physical downlink control channel of a cell;
wherein the field of the downlink control information indicates whether a reduced capability user equipment is supported in the cell,
wherein the field of the downlink control information or another field provides assistance information related to whether the cell is barred to the reduced capability user equipment based on a capability set associated with the reduced capability user equipment, or based on a time period consideration, wherein the field of the downlink control information provides cell reselection assistance information to assist with locating a reduced capability cell, wherein the field of the downlink control information provides assistance information related to a system access check and/or system information acquisition, wherein the field of the downlink control information comprises at least one bit, wherein the field is implemented using one or more reserved bits of the downlink control information, wherein the one or more reserved bits of the downlink control information are reserved for non-RedCap user equipments.

27. The apparatus of claim 26, wherein the downlink control information is transmitted on a control resource set used for system information block scheduling information, and cyclic redundancy check bits of the downlink control information are scrambled with a system information radio network temporary identifier, wherein the control resource set is CORESET #0, and the system information block scheduling information is SIB1.

28. The apparatus of claim 26, wherein the downlink control information is DCI Format 1_0.

29. A non-transitory program storage device readable with an apparatus, tangibly embodying a program of instructions executable with the apparatus for performing operations, the operations comprising the method as claimed in claim 1.

30. A non-transitory program storage device readable with an apparatus, tangibly embodying a program of instructions executable with the apparatus for performing operations, the operations comprising the method as claimed in claim 12.

* * * * *